July 10, 1956  C. E. OHLHEISER  2,754,378
HUMIDITY DETECTOR FOR PACKAGES
Filed Dec. 26, 1951  2 Sheets-Sheet 1

INVENTOR.
CARLTON E. OHLHEISER
BY Herman L. Gordon
ATTORNEY

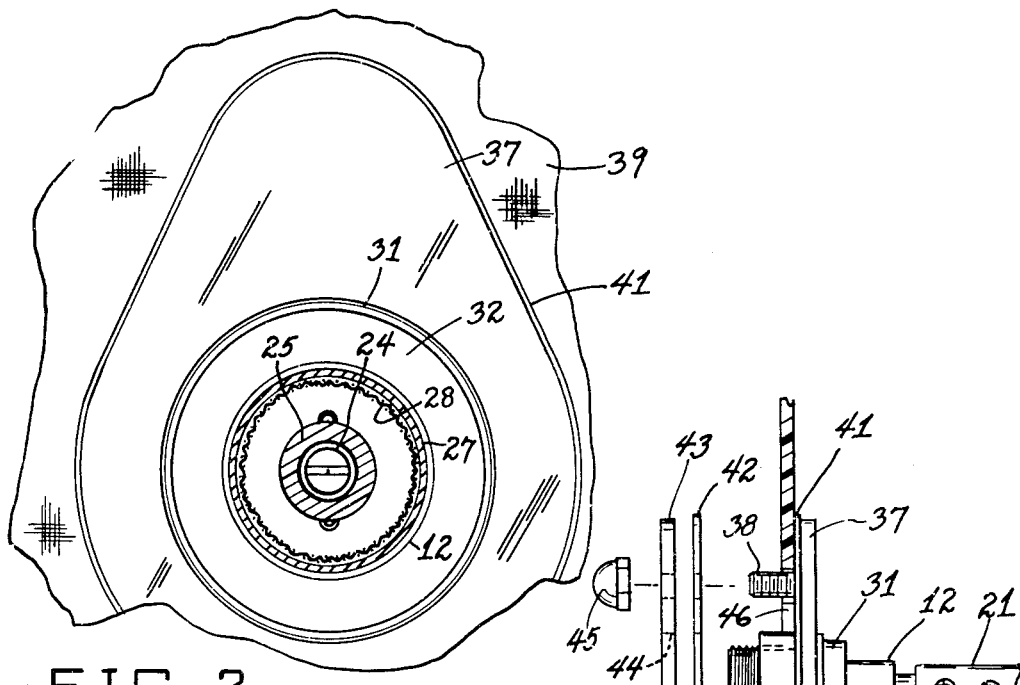
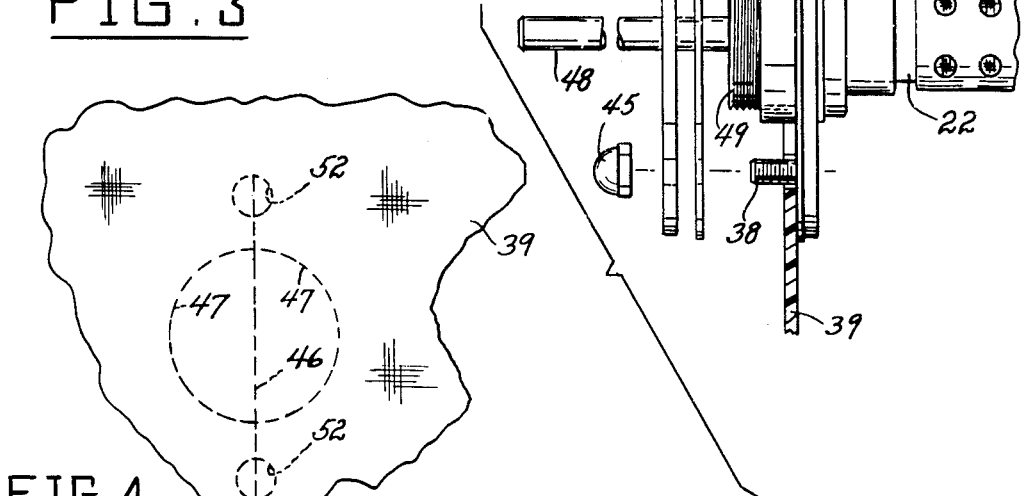
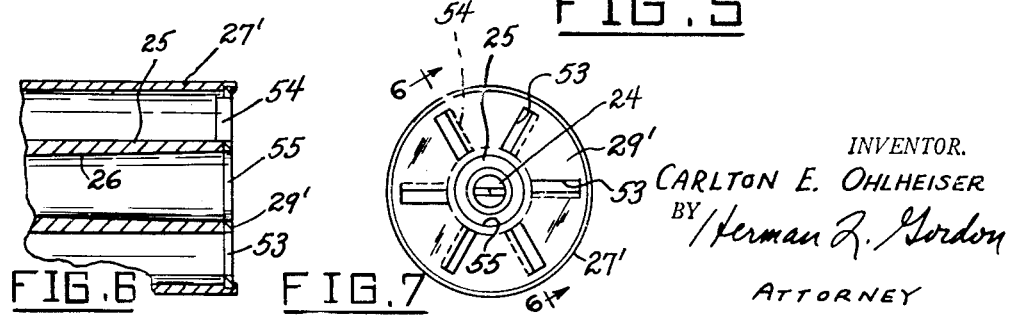

United States Patent Office 2,754,378
Patented July 10, 1956

2,754,378

HUMIDITY DETECTOR FOR PACKAGES

Carlton E. Ohlheiser, Silver Spring, Md., assignor to American Instrument Company, Inc., Silver Spring, Md.

Application December 26, 1951, Serial No. 263,418

6 Claims. (Cl. 201—63)

This invention relates to moisture indicators, and more particularly to means for detecting moisture inside a sealed container.

A main object of the invention is to provide a novel and improved moisture sensing device for use in packages, said device being simple in construction, being easy to install, and providing a means for determining whether or not the moisture state within a sealed container has exceeded safe limits for corrosion prevention.

A further object of the invention is to provide an improved moisture sensing device for use in packages, said device being inexpensive to manufacture, being reliable in action, and enabling measurements of humidity in a package to be made without breaking the moisture barrier of the package and without requiring observation windows to be provided in the package for moisture detection.

Further objects and advantages of the invention will become apparent from the following description and claims and from the accompanying drawings, wherein:

Figure 3 is a cross-sectional view taken on the line 3—3 of Figure 1.

Figure 4 is a fragmentary elevational view of a portion of the flexible moisture-sealing wall of a package and illustrating the manner of forming the openings in said wall to receive the moisture-sensing device of Figures 1 to 3.

Figure 5 is a vertical cross-sectional view taken through an apertured package wall and showing the method of mounting the moisture sensing device of Figures 1 to 3, parts of the device being shown separated and in positions for assembly.

Figure 6 is a fragmentary longitudinal cross-sectional view taken through the end portion of a modified form of moisture sensing element according to the present invention, said view being taken on line 6—6 of Figure 7.

Figure 7 is an end view of the sensing element of Figure 6.

Figure 1:
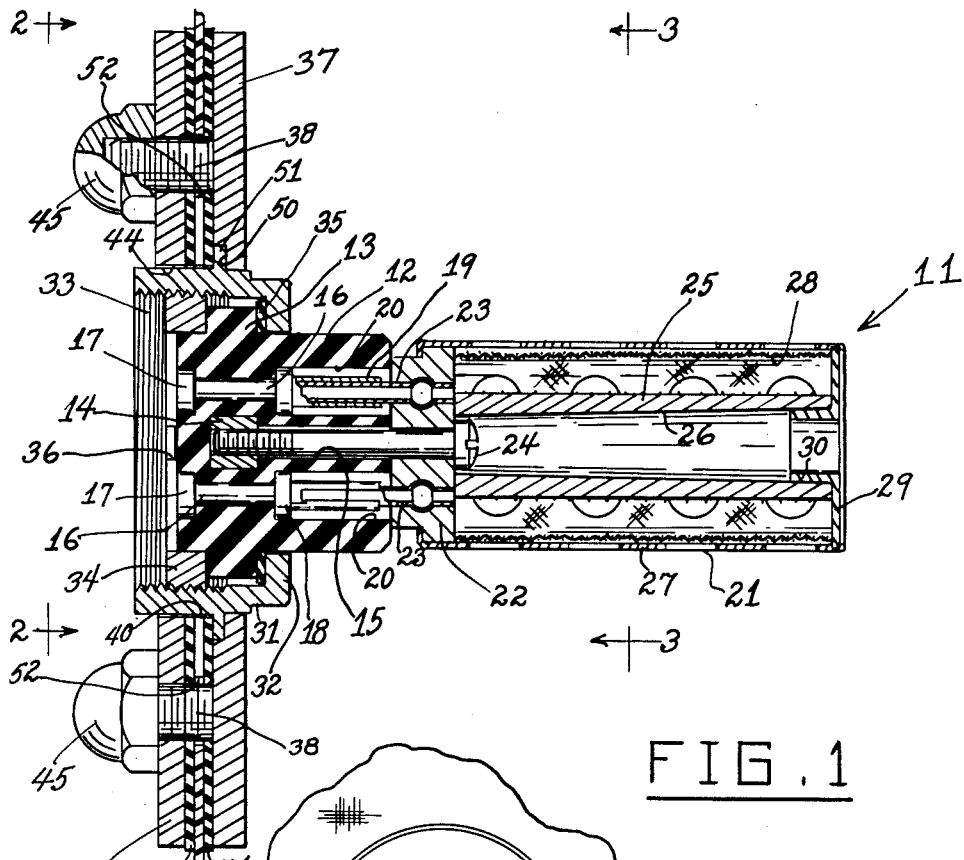
Figure 1 is a vertical cross-sectional view taken through an improved moisture-detecting device according to the present invention, shown installed in the wall of a package.
Figure 2:
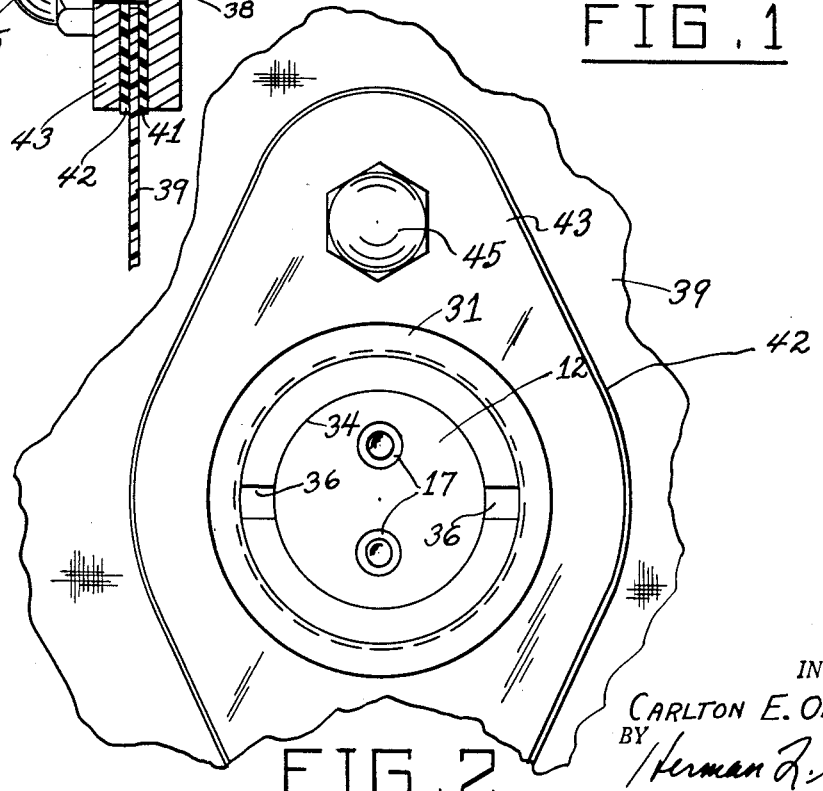
Figure 2 is an elevational view taken on the line 2—2 of Figure 1.

A primary purpose of the present invention is to provide a simple inexpensive electrical moisture indicator which may be rapidly and easily installed in a sealed container or package for the purpose of reliably indicating whether the moisture in the container or package has exceeded the safe limits for corrosion prevention. The present invention contemplates a device which can be secured on a wall of a container or package with the humidity sensing element thereof supported inside the container or package so as to be exposed to humidity inside the container, the device having electrical terminals exposed outside the container which may be connected to a suitable indicating circuit having a meter calibrated in terms of humidity, or otherwise calibrated to indicate "safe" or "unsafe" moisture conditions in the container. Thus, a leaky container, or one in which the dessicant has failed, can be spotted quickly before corrosion can damage its contents.

With devices according to this invention, packages of equipment, such as military equipment or the like, may be checked at regular intervals, without opening the packages, to determine whether repackaging or replacement of dessicant is necessary.

The electrical humidity sensing element employed in the device of the present invention is of the type comprising bifilar conductors wound on an insulating form and covered with a thin film of hygroscopic material, such as lithium chloride or the like, whose conductivity changes rapidly with changes in water vapor pressure. Therefore, the sensing element responds quickly to the presence of humidity, and readings may be taken instantaneously.

The device contemplated by the present invention is applicable to all types of packages, ranging from heavy metal containers to foil-wrapped packages. The device may be employed in a pressurized container, since pressure changes do not affect the humidity readings. The specific design of the embodiment of the invention illustrated and described herein is particularly suitable for packages wrapped in foil or other flexible wall material, which may be readily slit and cut out to permit insertion of the device into the package and sealing of the supporting elements of the device to the margins of the aperture formed.

It will be readily understood that by the use of the device of the present invention, it is not necessary to provide windows in the package to observe the humidity condition and/or that of the dessicant therein, or to observe the condition of humidity indicators located in the package.

Referring now to the drawings, a preferred form of the improved humidity sensing device of the present invention is designated generally at 11. Designated at 12 is a body of insulating material which may be generally circular in cross-section and which is formed adjacent one end with an annular rib 13. Embedded centrally in the body 12 is an internally threaded metal sleeve 14 which communicates with an axial bore 15 extending to the opposite end of the body. Embedded in the body on opposite sides of the metal insert 14 are the respective conductors 16, 16. Said conductors have enlarged contact heads 17 exposed at said one end of the body 12. The conductors are formed at their opposite ends with enlarged heads 18 formed integrally with axially extending resilient, split, prong-receiving sleeves 19 extending through respective bores 20 formed in body 12 and opening at the said opposite end thereof.

Designated generally at 21 is a pronged humidity-sensing element having an insulating base 22 in which are embedded the respective prongs 23, 23 which are detachably engaged in the respective contact sleeves 19, 19. Extending axially through the base 22 is a headed fastening bolt 24 which is threadedly engaged in the insert 14 to lock the base 22 to the body 12. Secured axially to base 22 is the cylindrical form 25 which carries the spaced bifilar windings and the film of hygroscopic material such as lithium chloride or the like. Said windings are connected to the respective prongs 23, 23. The form 25 is formed with a tapered axial bore 26 to permit the insertion of the fastening bolt 24. Secured to the body 22 and surrounding the form 25 is the apertured rigid shield 27, and secured in said shield is a cylindrical screen 28. Designated at 29 is an annular end cap which has a neck portion 30 secured in the end of bore 26 and which is secured at its periphery to the rim of shield 27, thus covering the end of the annular space defined between the form 25 and said shield.

Designated at 31 is an annular shell member of rigid material which receives the end portion of body 12, said shell member being formed with an inwardly directed end flange 32. Disposed adjacent flange 32 is an annular gasket 35, against which rib 13 is engaged. The shell member 31 is internally threaded at 33, and engaged therein is a clamping ring 34 which exerts sealing force on rib 13. Ring 34 may be formed with diametrically opposed recesses 36, 36 for engagement by a suitable tool to rotate said ring 34 in the threads 33, whereby clamping pressure may be exerted on rib 13.

Rigidly secured to the shell member 31 is a generally oval rigid flange 37 having rigidly secured to its opposite end portions the respective threaded studs 38, 38. Flange 37 is formed with a central aperture receiving shell member 31, said aperture having a marginal circumferential recess 50 which receives an annular flange 51 integrally formed on said shell member, the flange 37 being rigidly secured to flange 51 by staking flange 37 to shell 31 along the joint between shell 31 and the inner side of flange 37. Designated at 39 is the wall of the package. Said wall is formed with a large circular opening 40 receiving shell member 31 and respective smaller circular openings 52, 52 receiving the studs 38, 38. Flange 37 is arranged on the inner side of wall 39, and a gasket 41 of resilient deformable material is interposed between said flange and the wall. The gasket closely surrounds the shell member 31 and studs 38, and sealingly overlaps the joint between flange 51 and recess 50. Another similar gasket 42 is disposed against the outer surface of the wall 39, and a rigid plate member 43, similar in shape to flange 37, is engaged on the studs 38, said plate member having a central opening 44 through which shell member 31 extends. Engaged on the studs 38, 38 are the cap nuts 45, 45, which are tightened to exert clamping force on the rigid plate member 43.

With the parts thus assembled, the humidity sensing element 21 is securely supported inside the package, and humidity in the package may be measured by engaging the terminals of an electrical indicating circuit with the exposed ends 17 of the respective conductors 16, 16.

The openings 40 and 52, 52 may be formed in the wall 39 by first slitting the wall along a straight line, as shown at 46 in Figure 4, and then cutting away the wall along the semicircular lines 47, 47. The opening 40 is thus defined. The smaller circular openings 52, 52 may then be cut out at the opposite ends of the slit 46. The main portions of the device, including the gasket 41, are then mounted on a handle member 48, as shown in Figure 5, said handle member having an enlarged externally threaded head 49 which is threadedly engaged in the threads 33 of shell 31. By means of the handle 48, the said main portions of the device are then inserted through the opening 40 and held in the position shown in Figure 5. The gasket 42 and the plate member 43 are then engaged on the studs 38, 38, and the cap nuts 45 are then threaded on the studs. After said cap nuts have been tightened to effect sealing and clamping securement of the device to the wall 39, as above explained, the handle 48 is disengaged from the device by rotating same to unscrew head 49 from shell 31. This completes the installation.

Obviously, the device may be readily installed in hermetically sealed package walls of rigid material, as well as those made of flexible material.

Referring now to the modified form of humidity sensing element illustrated in Figures 6 and 7, the outer shield of the element, designated at 27', may be imperforate, and the end wall of the element, shown at 29', may be formed with openings, such as a plurality of radial slots 53, defined by striking down the respective inwardly projecting rectangular radial lugs 54. The inner ends of the radial lugs 54 frictionally engage the periphery of the rim portion of the tubular form 25. The periphery of end wall 29' may be rigidly secured in any suitable manner to the rim of shell 27'. Said end wall is formed with a circular central opening 55 registering with bore 26, as shown. The inner screen 28, employed in the embodiment illustrated in Figure 1, may be omitted.

While certain specific forms of an improved humidity sensing device for hermetically sealed packages or containers have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a humidity sensing element, a base, a plurality of contact prongs of electrically conducting material secured in said base, a tubular support secured to said base opposite said prongs, said base being formed with an opening communicating with the interior of said support, electrical means responsive to humidity supported on the outside of the tubular support and electrically connected to the prongs, an outer perforated shield secured to said base around said support, and an annular cap secured to the ends of said support and shield, covering the space on the end of the element between the support and shield but allowing physical access to the interior of the support.

2. In a humidity sensing element, a base, a plurality of contact prongs of electrically conducting material secured in said base, a tubular support secured to said base opposite said prongs, said base being formed with an opening communicating with the interior of said support, electrical means responsive to humidity supported on the outside of the tubular support and electrically connected to the prongs, an outer perforated shield secured to said base around said support, an annular cap secured to the end of the shield, covering the space on the end of the element between the support and shield but allowing physical access to the interior of the support, and a neck portion on said cap secured in the end portion of the tubular support opposite said base.

3. In a humidity sensing element, a base, a plurality of contact prongs of electrically conducting material secured in said base, a tubular support secured to said base opposite said prongs, said tubular support having an interior bore tapering in diameter toward said base, said base being formed with an opening communicating with said interior bore, electrical means responsive to humidity supported on the outside of the tubular support and electrically connected to the prongs, an outer perforated shield secured to said base around said support, and an annular cap secured to the end of the support, covering the space on the end of the element between the support and shield but allowing physical access to the interior of the support.

4. In a humidity sensing element, a base, a plurality of contact prongs of electrically conducting material secured in said base, a tubular support secured to said base opposite said prongs, said base being formed with an opening communicating with the interior of said support, electrical means responsive to humidity supported on the outside of the tubular support and electrically connected to the prongs, an outer perforated shield secured to said base around said support, a cylindrical screen secured in said shield adjacent its inside surface, and an annular cap secured to the ends of said support and shield, covering the space on the end of the element between the support and shield but allowing physical access to the interior of the support.

5. In a humidity sensing element, a base, a plurality of contact prongs of electrically conducting material secured in said base, a tubular support secured to said base opposite said prongs, said base being formed with an opening communicating with the interior of said support, electrical means responsive to humidity supported on the outside of the tubular support and electrically connected to the prongs, an outer perforated shield secured to said base around said support, and an annular cap secured to the ends of said support and shield, substantially covering the space on the end of the element between the support and shield but allowing physical access to the interior of the support, said cap being formed with a plurality of radial slots.

6. In a humidity sensing element, a base, a plurality of contact prongs of electrically conducting material secured in said base, a tubular support secured to said base opposite said prongs, said base being formed with an opening communicating with the interior of said support, electrical means responsive to humidity supported on the outside of the tubular support and electrically connected to the prongs, an outer perforated shield secured to said base around said support, and an annular cap secured to the ends of said support and shield, substantially covering the space on the end of the element between the support and shield but allowing physical access to the interior of the support, said cap being formed with a plurality of radial slots defined by striking down respectively inwardly projecting rectangular radial lugs in the cap, the inner ends of the radial lugs frictionally engaging the periphery of the rim portion of the tubular support.

References Cited in the file of this patent

UNITED STATES PATENTS

| | | |
|---|---|---|
| 637,282 | Poche | Nov. 21, 1899 |
| 2,265,341 | Borchert | Dec. 9, 1941 |
| 2,278,974 | Christensen | Apr. 7, 1942 |
| 2,397,097 | Forbes | Mar. 26, 1946 |
| 2,445,073 | Marette et al. | July 13, 1948 |
| 2,470,066 | Calabrese | May 10, 1949 |
| 2,494,628 | Oberding | Jan. 17, 1950 |
| 2,587,391 | Seaver | Feb. 26, 1952 |
| 2,610,222 | Burtt et al. | Sept. 9, 1952 |

FOREIGN PATENTS

| | | |
|---|---|---|
| 888,098 | France | Aug. 30, 1943 |
| 601,745 | Great Britain | May 12, 1948 |

OTHER REFERENCES

Industrial & Engineering Chemistry, January 1947, p. 83A.